March 19, 1968     S. PAPETTI     3,374,259
CYCLIC ORGANOSILYLAMINE CARBORANES AND PROCESS THEREFOR
Filed Sept. 20, 1963

FORMULA I

○ BORON

◍ CARBON o HYDROGEN ON CARBON
(HYDROGEN ATOMS ON BORON
OMITTED FOR CLARITY)

INVENTOR.
STELVIO PAPETTI
BY *Walter O. Hunter*

AGENT

United States Patent Office 3,374,259
Patented Mar. 19, 1968

3,374,259
CYCLIC ORGANOSILYLAMINE CARBORANES
AND PROCESS THEREFOR
Stelvio Papetti, Hamden, Conn., assignor to Olin
Mathieson Chemical Corporation, a corporation
of Virginia
Filed Sept. 20, 1963, Ser. No. 310,422
19 Claims. (Cl. 260—448.2)

ABSTRACT OF THE DISCLOSURE

Cyclic silicon and nitrogen-containing organoboron compounds are prepared by reacting a compound of the formula:

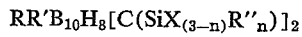

Figure 1:
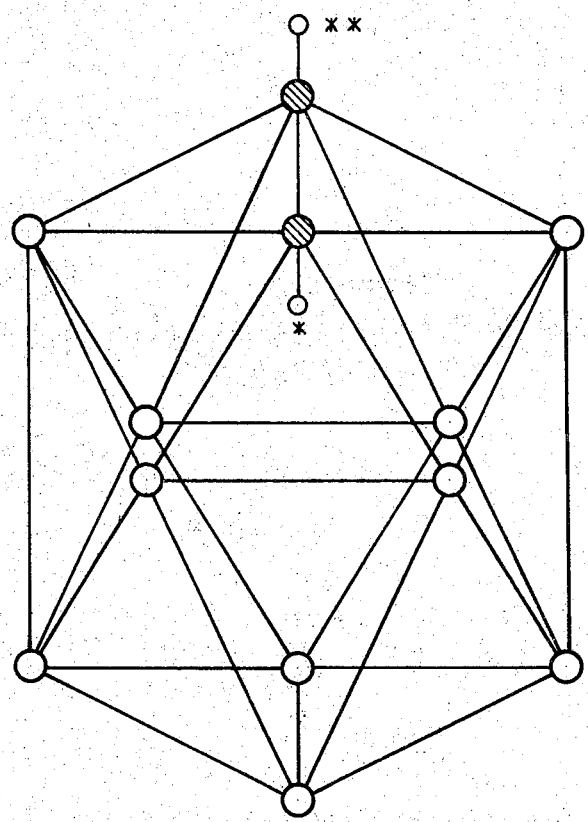

wherein R and R' are each selected from a group consisting of hydrogen and an alkyl radical containing from 1 to 5 carbon atoms, R" is selected from the group consisting of an alkyl radical containing from 1 to 5 carbon atoms or an aryl radical containing not more than 10 carbon atoms, X is a halogen selected from the group consisting of chlorine, bromine and iodine, and $n$ is an integer of from 0 to 2 inclusive, with a nitrogen-containing compound of the formula:

wherein R''' is selected from the group consisting of hydrogen, alkyl of from 1 to 8 carbon atoms, or phenyl.

---

This invention relates to organoboron compounds containing both silicon and nitrogen, and to a method for their preparation.

The novel compounds of this invention have the formula:

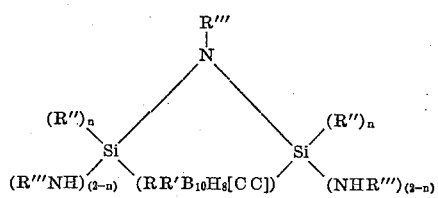

wherein R and R' are each selected from the group consisting of hydrogen or an alkyl radical having from 1 to 5 carbon atoms, R" is selected from the group consisting of an alkyl radical having from 1 to 5 carbon atoms or an aryl radical having not more than 10 carbon atoms, R''' is selected from the group consisting of hydrogen, phenyl or an alkyl group having from 1 to 8 carbon atoms, and $n$ is an integer of from 0 to 2 inclusive.

It has been found that the novel organoboranes of this invention can be prepared by reacting a compound of the formula:

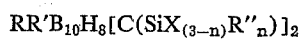

wherein R and R' are each selected from a group consisting of hydrogen and an alkyl radical containing from 1 to 5 carbon atoms, R" is selected from the group consisting an alkyl radical containing from 1 to 5 carbon atoms or an aryl radical containing not more than 10 carbon atoms, X is a halogen being selected from the group consisting of chlorine, bromine and iodine, and $n$ is an integer of from 0 to 2 inclusive, with a nitrogen-containing compound of the formula:

wherein R''' is selected from the group consisting of hydrogen, alkyl of from 1 to 8 carbon atoms, or phenyl. The novel process of this invention is carried out in the presence of an inert organic solvent, preferably a lower dialkyl ether.

The reaction proceeds according to the following equation:

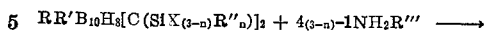
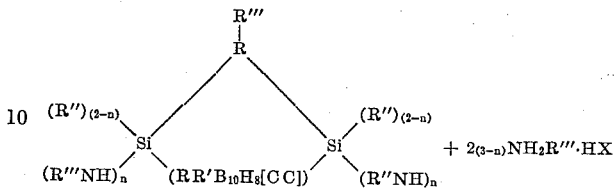

wherein R and R' are each selected from the group consisting of hydrogen or an alkyl radical having from 1 to 5 carbon atoms, R" is selected from the group consisting of an alkyl radical having from 1 to 5 carbon atoms or an aryl radical having not more than 10 carbon atoms and R''' is selected from the group consisting of hydrogen, phenyl or an alkyl group having from 1 to 8 carbon atoms, X is a halogen selected from the group consisting of chlorine, bromine and iodine and $n$ is an integer of from 0 to 2 inclusive. The reaction proceeds satisfactorily at room temperature although temperatures as low as about $-10°$ C. up to about $+80°$ C. can be employed. Preferably, the reaction temperature is maintained between about $-10°$ C. and about $+50°$ C. The reaction time in the process of this invention generally will be from about 0.05 hour to about 5 hours or more and preferably will be from about 0.10 hour to about 3 hours depending upon the particular reaction conditions employed. Although the reaction is generally carried out at atmospheric pressure, pressures varying from subatmospheric up to about $+5$ atmospheres or more can be employed. Stoichiometric quantities of the reactants are usually employed although, if desired, an excess of the nitrogen-containing reaction in an amount from about 1.5 to about 3.5 times or more of the stoichiometric requirement can be utilized.

With the nitrogen-containing compound employed is a gas at room temperature (e.g., ammonia or monomethylamine), it is simply passed into a solution of the silicon-containing organoboron starting material dissolved in the lower dialkyl ether. If a liquid nitrogen-containing compound is employed, for example, monopropylamine, it is added directly to the silicon-containing organoboron dissolved in the liquid dialkyl ether or other suitable inert solvent or it can be added as a solution of the nitrogen-containing compound in an inert organic solvent. The hydrohalide salt formed during the reaction is insoluble in the reaction mixture and can be removed by centrifugation, filtration, or by any other convenient method. Evaporation of the reaction mixture to dryness after the hydrohalide salt has been removed yields the crude product which can be purified by recrystallization from a wide variety of solvents such as benzene, xylene, toluene, chloroform, ethanol, propanol, isobutanol, petroleum ether, etc.

Suitable solvents for use in the process of this invention include the lower dialkyl ethers, such as diethyl ether, di-n-propyl ether, methyl ethyl ether, diisopropyl ether, di-n-butyl ether, di-isoamyl ether, etc. Other useful solvents include aromatic hydrocarbons such as benzene, toluene, xylene, etc.

The bis(halo alkylsilyl) carboranes and the bis(halo arylsilyl) carboranes suitable as starting materials for the process of this invention can be prepared by the process set forth in Papetti application Ser. No. 310,379, filed Sept. 20, 1963, for Compound and Process. The compound bis(chloro dimethylsilyl) carborane, for example, can be prepared by reacting carborane

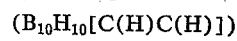

successively with butyl lithium and dichloro dimethylsilane in a solution in diethyl ether at ice-bath temperature. Other useful bis(halo alkylsilyl) carboranes include bis(chloro diethylsilyl) carborane, bis(chloro di-n-butylsilyl) carborane, bis(chloro diisoamylsilyl) carborane, bis(chloro methylethylsilyl) carborane, bis(dichloro methylsilyl) carborane, bis(dichloro n-butylsilyl) carborane, and the corresponding bromine and iodine derivatives. Suitable bis(halo arylsilyl) carboranes include bis(chloro diphenylsilyl) carborane, bis(dichloro phenylsilyl) carborane, bis(dichloro tolylsilyl) carborane, bis(dichloro xylylsilyl) carborane, etc., and the corresponding bromine and iodine derivatives. The compound bis(trichloro silyl) carborane and the corresponding bromine and iodine derivatives are also useful starting materials for this process.

Nitrogen-containing compounds useful as starting materials in this invention include ammonia, aniline, monomethylamine, monoethylamine, monoisopropylamine, mono-n-propylamine, monoisoamylamine, etc.

The following examples illustrate specific embodiments of this invention and are to be considered not limitative.

In the examples the term "moles" signifies "gram moles."

Example I

Bis(chloro dimethylsilyl) carborane (2.69 g., 0.0081 mol.) was dissolved in 50 ml. of ethyl ether and cooled by means of an ice bath. Ammonia was passed through at a rapid rate for 15 minutes during which time a precipitate formed. The mixture was filtered and the filtrate was evaporated to dryness. The residue so formed was recrystallized from high boiling petroleum ether to give an essentially quantitative yield of Compound A, M.P. 190–192° C.

*Analysis.*—Calc'd for $C_6H_{23}B_{10}NSi_2$: C, 26.29; H, 8.46; B, 39.39; N, 5.11; Si, 20.49; M.W., 274. Found: C, 26.58; H, 8.21; B, 39.70; N, 5.05; Si, 19.6; M.W., 270.

Compound A has the formula:

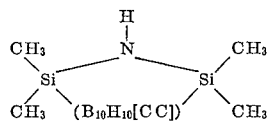

Example II

The procedure of Example I was followed exactly using 2.0 g. (.006 mol.) of bis(dichloro methylsilyl) carborane to give a quantitative yield of Compound B, M.P. 189–191.5° C.

*Analysis.*—Calc'd for $C_4H_{21}B_{10}NSi_2$: C, 17.42; H, 7.68; B, 39.26; N, 15.25; Si, 20.38; M.W., 276. Found: C, 17.41; H, 7.83; B, 38.48; N, 14.64; Si, 20.08; M.W., 278 (cryoscopic).

Compound B has the formula:

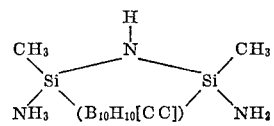

Example III

Methylamine was bubbled through a cooled solution of 4.7 g. (0.014 mol.) of bis(dichloro methylsilyl) carborane in 60 ml. of ether for 30 minutes. The mixture was filtered, the filtrate concentrated and the resulting solid was recrystallized from 30–60° C. petroleum ether to give an essentially quantitative yield of Compound C, M.P. 128–129.5° C.

*Analysis.*—Calc'd for $C_7H_{27}B_{10}N_3Si_2$: N, 13.23; Si, 17.68; M.W., 318. Found: N, 13.31; Si, 17.68; M.W., 325 (cryoscopic).

Compound C has the formula:

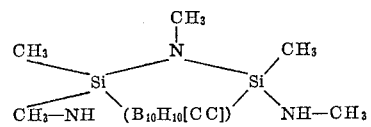

Example IV

Methylamine was bubbled through a cooled solution of 7.3 g. (0.022 mol.) of bis(chloro dimethylsilyl) carborane in 75 ml. ether for 35 minutes giving a voluminous precipitate which changed into an oil. The mixture was concentrated to dryness under vacuum yielding a solid residue. The residue was extracted with ether, filtered, and the resulting solid was recrystallized from 30–60° C. petroleum ether to give an essentially quantitative yield of Compound D, M.P. 156–158° C.

*Analysis.*—Calc'd for $C_7H_{25}B_{10}NSi_2$: B, 37.6; C, 29.2; H, 8.76; N, 4.87; Si, 19.48. Found: B, 37.42; C, 29.26; H, 8.63; N, 4.81; Si, 18.4; 18.6.

Compound D has the formula:

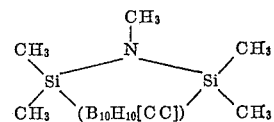

Example V

Bis(chloro dimethylsilyl) carborane (0.515 g., 0.0167 mole) was dissolved in 50 ml. of dry benzene and 5.0 g. (0.0538 mole) of aniline was added dropwise. During the addition of the aniline the reaction mixture was cooled by means of an ice-water bath. After the aniline had been added it was observed that an emulsion of an oily material had been formed and that a small amount of solid material was also present in the reaction mixture. After evaporation of the reaction mixture to dryness, the mixture of the oil and solid remaining was extracted with a small quantity of diethyl ether. The ether extract was evaporated to dryness, the wet-appearing residue was sublimed and finally the pure product (E) was obtained by recrystallization of the sublimate from hexane, M.P. 183–185° C.

*Analysis.*—Calcd. for $C_{12}H_{27}B_{10}NSi_2$: C, 41.23; H, 7.79; B, 30.97; N, 4.01; Si, 16.04. Found: C, 41.08; H, 7.79; B, 30.69; N, 3.95; Si, 15.48.

Compound E has the formula:

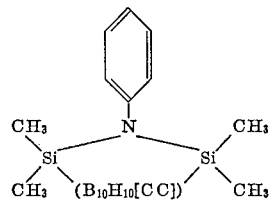

The structural formula of Compound A has the same structural formula as Formula I in FIGURE 1 with the exception that the hydrogen atoms indicated by the single and double asterisks are replaced by the radical:

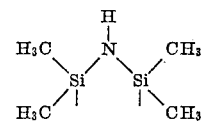

Compound B which was prepared in Example II has the same structural formula as structural Formula I in FIGURE 1 with the exception that the hydrogen atoms indicated by the single and double asterisks are replaced by the radical:

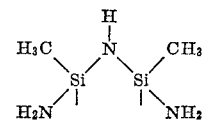

Compound C prepared in Example III as structural Formula I in FIGURE 1 with the exception that the hydrogen atoms as indicated by the single and double asterisks are replaced by the radical:

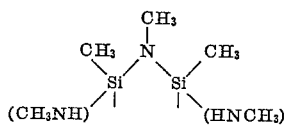

Compound D prepared in the Example IV has the same structural formula as structural Formula I in FIGURE 1 with the exception that the hydrogen atoms indicated by the single and double asterisks are replaced by the radical:

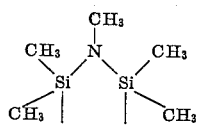

The compound prepared in Example V (Compound E) has the same structural formula as structural Formula I in FIGURE 1 with the exception that the hydrogen atoms indicated by the single and double asterisks are replaced by the radical:

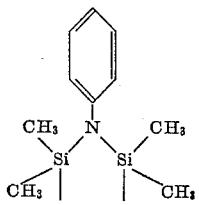

The solid organoboranes produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided organoborane material can be admixed with a high solids content solution of partially condensed urea-formaldehyde or phenol-formaldehyde resin, the proportions being such that the amount of resin is about 5 to 100 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

What is claimed is:

1. A compound of the formula:

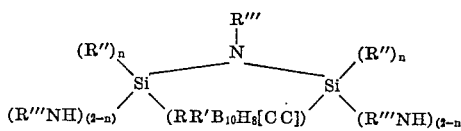

wherein R and R' are each selected from the group consisting of hydrogen or an alkyl radical having from 1 to 5 carbon atoms, R" is selected from the group consisting of an alkyl radical having from 1 to 5 carbon atoms and an aryl radical having not more than 10 carbon atoms, R''' is selected from the group consisting of hydrogen, phenyl or an alkyl group having from 1 to 8 carbon atoms, and $n$ is an integer of from 0 to 2 inclusive.

2.

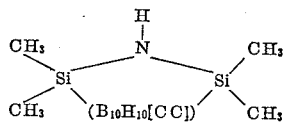

3.

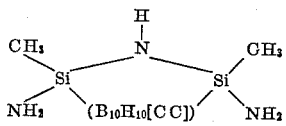

4.

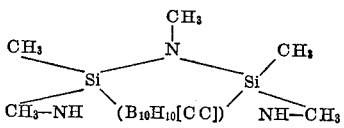

5.

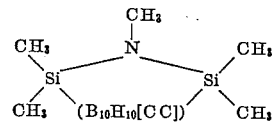

6.

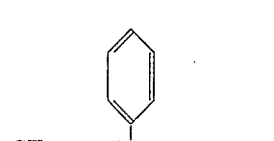

7. A method for the preparation of organoboron compounds containing both silicon and nitrogen which comprises reacting in the presence of an inert organic solvent a silicon-containing compound of the formula:

$$RR'B_{10}H_8[C(SiX_{(3-n)}R''_n)]_2$$

wherein R and R' are each selected from the group consisting of hydrogen or an alkyl radical having from 1 to 5 carbon atoms, R" is selected from the group consisting of an alkyl radical having from 1 to 5 carbon atoms or an aryl radical having not more than 10 carbon atoms, X is selected from the group consisting of chlorine, bromine and iodine, and $n$ is an integer of from 0 to 2 inclusive with a nitrogen-containing compound of the formula:

$$NH_2R'''$$

wherein R''' is selected from the group consisting of hydrogen, phenyl and an alkyl group having 1 to 8 carbon atoms.

8. The method of claim 6 in which the inert organic solvent is diethyl ether.

9. The method of claim 6 wherein the said silicon-containing compound is bis(chloro dimethylsilyl) corborane.

10. The method of claim 6 wherein the said silicon-containing compound is bis(dichloro methylsilyl) carborane.

11. The method of claim 6 in which the said nitrogen-containing compound is ammonia.

12. The method of claim 6 in which the said nitrogen-containing compound is methylamine.

13. The method of claim 6 in which the said nitrogen-containing compound is aniline.

14. The method of claim 6 in which the process is carried out at temperatures between about −10° and about +80° C.

15. The method for the preparation of:

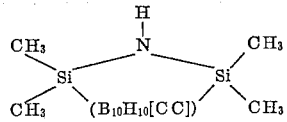

which comprises reacting ammonia with bis(chloro dimethylsilyl) carborane in the presene of diethyl ether and at a temperature of from about −10° and about +80° C.

16. The method for the preparation of:

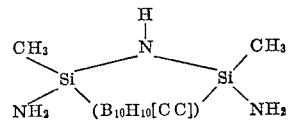

which comprises reacting ammonia with bis(dichloro methylsilyl) carborane in the presence of diethyl ether and at a temperature of from about −10° and about +80° C.

17. The method for the preparation of:

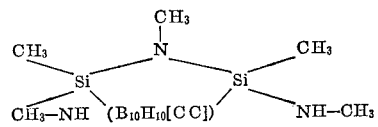

which comprises reacting methylamine with bis(dichloro methylsilyl) carborane in the presence of diethyl ether and at a temperature of from about −10° to about +80° C.

18. The method for the preparation of:

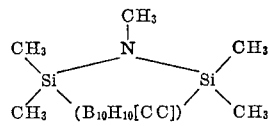

which comprises reacting methyl amine with bis(dichloro methylsilyl) carborane in the presence of diethyl ether and at a temperature of from about −10° to about +80° C.

19. The method for the preparation of:

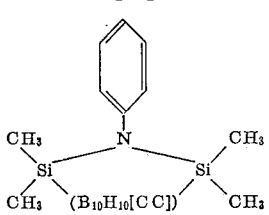

which comprises reacting aniline with bis(chloro dimethylsilyl) carborane in the presence of benzene at a temperature of from about −10° to about +80° C.

References Cited

UNITED STATES PATENTS

| | | | |
|---|---|---|---|
| 2,462,635 | 2/1949 | Haber | 260—448.2 |
| 2,503,919 | 4/1950 | Patnode | 260—448.2 |

OTHER REFERENCES

Eaborn: "Organosilicon Compounds," Academic Press Inc., New York (1960), pp. 339–341.

TOBIAS E. LEVOW, *Primary Examiner.*

P. F. SHAVER, *Assistant Examiner.*